United States Patent
Liu et al.

(10) Patent No.: US 9,870,077 B2
(45) Date of Patent: Jan. 16, 2018

(54) TOUCH PANEL AND CORRECTING APPARATUS THEREOF

(71) Applicant: MStar Semiconductor, Inc., Hsinchu Hsien (TW)

(72) Inventors: Chun-Chen Liu, Hsinchu County (TW); Meng-Che Tsai, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 348 days.

(21) Appl. No.: 14/164,406

(22) Filed: Jan. 27, 2014

(65) Prior Publication Data

US 2014/0218320 A1 Aug. 7, 2014

(30) Foreign Application Priority Data

Feb. 7, 2013 (TW) .............................. 102104825 A

(51) Int. Cl.
*G06F 3/041* (2006.01)
*G06F 3/0488* (2013.01)

(52) U.S. Cl.
CPC ............ *G06F 3/041* (2013.01); *G06F 3/0418* (2013.01); *G06F 3/0488* (2013.01)

(58) Field of Classification Search
CPC ....... G06F 3/041; G06F 3/0418; G06F 3/0488
See application file for complete search history.

(56) References Cited

U.S. PATENT DOCUMENTS

| | | | | |
|---|---|---|---|---|
| 2006/0159333 A1* | 7/2006 | Ishikawa | ................. | G06T 7/001 382/149 |
| 2011/0310038 A1* | 12/2011 | Park | ........................ | G06F 3/044 345/173 |
| 2011/0310045 A1* | 12/2011 | Toda | ..................... | G06F 3/0416 345/173 |
| 2012/0050221 A1* | 3/2012 | Kolokowsky | ........... | G06F 3/044 345/174 |

FOREIGN PATENT DOCUMENTS

| | | |
|---|---|---|
| CN | 102289316 | 12/2011 |
| CN | 102681729 | 9/2012 |
| TW | 1352307 | 11/2011 |

OTHER PUBLICATIONS

State Intellectual Property Office (SIPO) of the People's Republic of China, Office Action dated Jun. 7, 2016.
Taiwan Patent Office, "Office Action", dated Mar. 26, 2015.

* cited by examiner

*Primary Examiner* — Aneeta Yodichkas
(74) *Attorney, Agent, or Firm* — WPAT, PC

(57) ABSTRACT

A touch panel correcting apparatus for correcting a first coordinate and a second coordinate associated with a touch position is provided. The correcting apparatus includes a memory and a controller. The memory stores a look-up table storing a plurality of corrected coordinates. The controller selects a corrected first coordinate from the look-up table according to the first coordinate, and substitutes the corrected first coordinate and the second substitute into a function to generate a corrected second coordinate corresponding to the second coordinate.

10 Claims, 2 Drawing Sheets

TOUCH PANEL AND CORRECTING APPARATUS THEREOF

This application claims the benefit of Taiwan application Serial No. 102104825, filed Feb. 7, 2013, the subject matter of which is incorporated herein by reference.

BACKGROUND OF THE INVENTION

Field of the Invention

The invention relates in general to a touch system, and more particularly, to a technology for correcting sensing results of a touch panel.

Description of the Related Art

Operating interfaces of recent electronic products have become more and more user-friendly and intuitive as technology advances. For example, via a touch screen, a user can directly operate programs as well as input messages/texts/patterns with fingers or a stylus; in this way, it is much easier to convey demands than operating via traditional input devices such as a keyboard or buttons. In practice, a touch screen usually includes a touch sensing panel and a display device disposed at the back of the touch sensing panel. According to a position of a touch on the touch sensing panel and a currently displayed image on the display device, an electronic device determines an intention of the touch to execute corresponding operations.

Current touch control techniques are in general categorized into resistive, capacitive, electromagnetic, ultrasonic and optic types. Regardless of the type of a touch panel, a certain error exists between an actual touch position and a touch position determined by an electronic device. Such detection error may lead the electronic device to misjudging a user intention to further result in an unintended operation. Therefore, a correction mechanism is necessary.

In a conventional correcting method, a look-up table storing various possible sensing results and corresponding correction results is usually required. Taking a sensing result represented in two-dimensional x-coordinate (X) and y-coordinate (Y) for example, the look-up table needs to store an N sets of original two dimensional x-coordinates (X) and y-coordinates (Y) and an N set of corresponding corrected two-dimensional x-coordinates (X") and y-coordinates (Y"). Such method suffers from a drawback of requiring an enormous amount of memory space. As a touch control area provided by an electronic product expands, the memory space of the above conventional correcting method is also multiplied to cause to increased hardware costs.

SUMMARY OF THE INVENTION

The invention is directed to a touch panel, and a correcting apparatus and a correcting method thereof. By finding a relationship between two corrected coordinates and concluding the relationship into a mathematical operation, the correcting apparatus and correcting method of the present invention, after looking up one corrected coordinate, are capable of calculating the other coordinate according to the mathematical operation. Thus, the look-up table involved in the correcting apparatus and correcting method of the present invention is far smaller than a look-up table in the prior art, thereby reducing hardware costs of a touch system.

According to an embodiment of the present invention, a touch panel correcting apparatus for correcting a first coordinate and a second coordinate associated with a touch position is provided. The correcting apparatus includes a memory and a controller. The memory stores a look-up table storing a plurality of corrected coordinates. The controller selects a corrected first coordinate from the look-up table according to the first coordinate, and substitutes the corrected first coordinate and the second coordinate into a function to generate a corrected second coordinate corresponding to the second coordinate.

According to an embodiment of the present invention, a touch system is provided. The touch system includes a sensing module, a memory and a controller. The sensing module determines a first coordinate and a second coordinate associated with a touch position. The memory stores a look-up table storing a plurality of corrected coordinates. The controller selects a corrected first coordinate from the look-up table according to the first coordinate, and substitutes the corrected first coordinate and the second coordinate into a function to generate a corrected second coordinate corresponding to the second coordinate.

According to another embodiment of the present invention, a correcting method for a touch panel and a memory is provided. In response to a user touch, the touch panel generates a first coordinate and a second coordinate. The memory stores a coordinate look-up table storing a plurality of corrected coordinates. The correcting method includes steps of selecting a corrected first coordinate from the coordinate look-up table according to the first coordinate, and substituting the corrected first coordinate and the second coordinate into a function to generate a corrected second coordinate corresponding to the second coordinate.

According to another embodiment of the present invention, a touch panel correcting apparatus for correcting a first coordinate associated with a touch position is provided. The correcting apparatus includes a memory and controller. The memory stores a coordinate look-up table including a first look-up range and a second look-up range. The first look-up range includes a first corrected coordinate quantity within a unit length, and the second look-up range includes a second corrected coordinate quantity within the unit length. The first corrected coordinate quantity is different from the second corrected coordinate quantity. The controller determines whether the first coordinate corresponds to the first look-up range or the second look-up range. When the first coordinate corresponds to the first look-up range, the controller selects a corrected first coordinate for replacing the first coordinate from the first look-up range. When the first coordinate corresponds to the second look-up range, the controller selects the corrected first coordinate from the second look-up range.

According to yet another embodiment of the present invention, a correcting method for a touch panel and a memory is provided. In response to a user touch, the touch panel generates a first coordinate. The memory stores a coordinate look-up table including a first look-up range and a second look-up range. The first look-up range includes a first corrected coordinate quantity within a unit length, and the second look-up range includes a second corrected coordinate quantity within the unit length. The first corrected coordinate quantity is different from the second corrected coordinate quantity. The correcting method includes steps of: determining whether the first coordinate corresponds to the first look-up range or the second look-up range; when the first coordinate corresponds to the first look-up range, selecting a corrected first coordinate for replacing the first coordinate from the first look-up range; and when the first coordinate corresponds to the second look-up range, selecting the corrected first coordinate from the second look-up range.

DETAILED DESCRIPTION OF THE INVENTION

Figure 1:
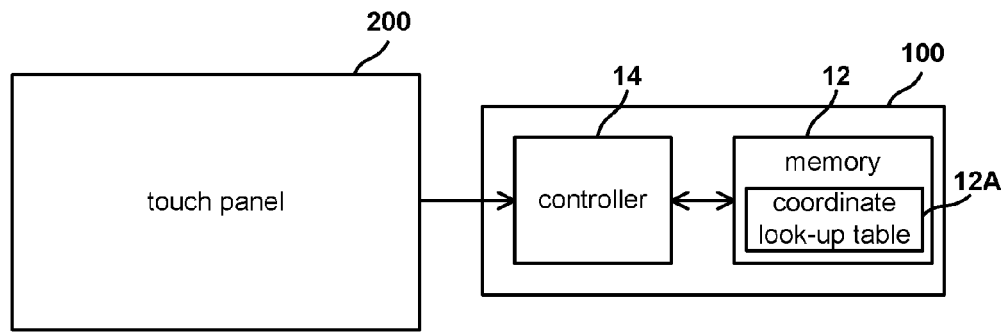
FIG. 1 is a block diagram of a touch panel correcting apparatus according to an embodiment of the present invention.

FIG. 1 shows a block diagram of a touch panel correcting apparatus according to an embodiment of the present invention. A correcting apparatus 100 includes a memory 12 and a controller 14. In practice, the correcting apparatus 100 may be integrated in an electronic system including a touch panel 200, or may be independently provided outside the electronic system. In the embodiment, a position of a touch point applied by a user on the touch panel 200 may be represented by two coordinate values (to be referred to as a first coordinate and a second coordinate), but is not limited to the representation in two-dimensional x-coordinate and y-coordinate. In the description below, the first coordinate is exemplified by the x-coordinate and the second coordinate is exemplified by the y-coordinate.

It can be easily appreciated by a person having ordinary skill in the art that, a corresponding relationship between coordinates that are not yet corrected (to referred to as original coordinates) and corrected coordinates can be measured through experiments and concluded in advance to serve as reference for correction. It is a spirit of the present invention that, the corresponding relationship between either the corrected first coordinate X" and the corrected second coordinate Y" or the original first coordinate X and the original second coordinate Y is described by a function. In one embodiment, a designer of the correcting apparatus 100, by utilizing a Lagrangian algorithm, determines a fitting curve that most approximates the corresponding relationship of the corrected first coordinate X", the corrected second coordinate Y" and the original second coordinate Y, and represents the curve by a function. It should be noted that, the function determined by the Lagrangian algorithm may not be capable of exactly describing the corresponding relationship of the corrected first coordinate X", the corrected second coordinate Y" and the original second coordinate Y, but is capable of minimizing an error between the function and the corresponding relationship.

Taking a capacitive touch panel for example, the above function may be altered if electrodes in different shapes or different electrode arrangements are adopted in the touch panel. In practice, the function may include more than one calculation. For example, under certain circumstances, the relationship between the corrected first coordinate X" and the corrected second coordinate Y" may be concluded as:

$$\begin{cases} Y_{SLOPE} = a*(X")^2 + b*X" + c \\ Y_{OFFSET} = d*(X")^2 + e*X" + f \\ Y" = Y_{SLOPE}*Y + Y_{OFFSET} \end{cases} \quad \text{equation (1)}$$

In equation (1), X" represents the corrected first coordinate, Y" represents the corrected second coordinate, Y represents the original second coordinate, and a to f are a set of parameters determined in advance by the Lagrangian algorithm.

In the embodiment, after the user touches the touch panel 200, the touch panel 200 provides the first coordinate X and the second coordinate Y of the touch position to the correcting apparatus 100. The memory 12 stores a pre-established coordinate look-up table 12A, which includes a plurality of corrected coordinates X'. The controller 14 first selects a corresponding corrected first coordinate X" from the look-up table 12A according to the original first coordinate X.

Next, the controller 14 substitutes the corrected first coordinate X" and the original second coordinate Y into a function to generate the corrected second coordinate Y". Assuming that equation (1) is the function adopted by the controller 14, the controller 14 first calculates a slope YSLOPE and an offset YOFFSET according to the corrected first coordinate X", and calculates the corrected second coordinate Y" according to the original second coordinate Y, the slope YSLOPE and the offset YOFFSET.

As illustrated by the above description, given that the correcting apparatus 100 looks up merely one corrected coordinate, the other corrected coordinate may be calculated through a function. Compared to the prior art that establishes a look-up table containing all possible x-coordinates and y-coordinates, the look-up table 12A storing only a plurality of corrected coordinates X' is much simpler and the memory space can thus be significantly reduced.

In practice, more than two coordinates representing the touch position may be generated by the touch panel 200 (e.g., when a touch surface is a spherical surface). Provided that the corresponding relationship of any two corrected coordinates can be concluded into a specific function, the concept of the present invention may be applied to reduce the memory space.

Figure 2:
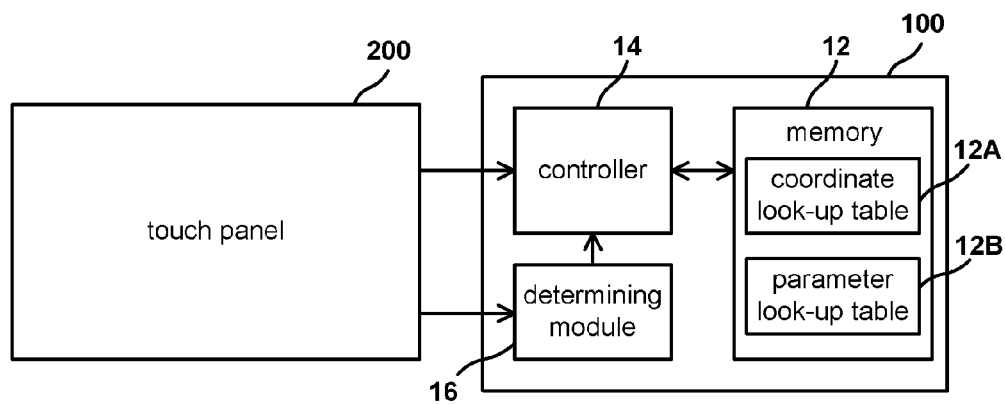
FIG. 2 is an example of a correcting apparatus of the present invention further including a determining module.

In practice, the parameters in an operation adopted by the controller 14 may be further selectively adjusted according to different touch control situations or touch control ranges. For example, for touch points in different sizes, the parameters a to f of the corresponding relationship that most appropriately describes the corrected first coordinate X" and the corrected second coordinate Y" may be different. As shown in FIG. 2, in another embodiment, the correcting apparatus 100 further includes a determining module 16 configured to determine a touch point size corresponding to the touch position. Taking a capacitive touch panel for example, the determining module 16 may determine the touch point size according to a value of a total capacitance change. Correspondingly, the memory 12 further stores a parameter look-up table 12B storing a plurality of sets of candidate parameters. The controller 14 may select a set of parameters from the plurality of sets of candidate parameters according to the touch point size, and substitute the selected set of parameters into the function for generating the second corrected coordinate Y".

Figure 3:
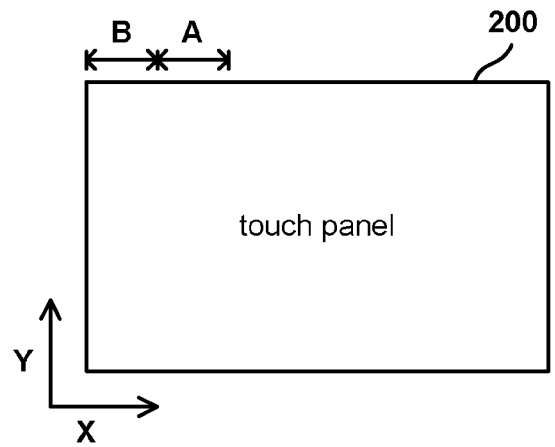
FIG. 3 illustrates distributions of different look-up ranges with different information densities.

In general, as the touch position gets closer to a central region of the touch panel 200, the difference between the original coordinate and the corrected coordinate gets smaller. Conversely, as the touch position gets closer to border regions of the touch panel 200, the difference between the original coordinate and the corrected coordinate gets larger. Therefore, according to an embodiment of the present invention, the look-up table 12A is designed to include a plurality of look-up ranges having different information densities. More specifically, the corresponding look-up range for near the central region is designed to have a lower information density. That is, for per unit length within an X section (e.g., a section A in FIG. 3), a smaller quantity of corrected coordinates are stored (e.g., a set of data is stored per 0.5 mm). On the other hand, the corresponding look-up range for near the border regions is designed to have a higher information density. For example, for per unit length within an X section (e.g., a section B in FIG. 3), a greater quantity of corrected coordinates are stored (e.g., a set of data is stored per 0.05 mm).

Thus, the controller 14 may determine within which look-up range the original first coordinate X provided by the touch panel 200 falls, and select the corrected first coordinate X" according to the look-up range within which the original first coordinate X falls. The above approach is capable of lowering the quantity of corrected coordinates within certain look-up ranges to further reduce the memory space consumed by the look-up table 12A.

A touch system having a correcting function is provided according to another embodiment of the present invention. The touch system includes a sensing module, a memory and a controller. That is, the touch system is an electronic system that integrates the foregoing correcting apparatus 100 and touch panel 200. Various modifications in the description associated with the correcting apparatus 100 are applicable to the touch system, and shall be omitted herein. It should be noted that, the correcting apparatus 100 may be applied to the touch panel 200 that adopts different sensing mechanisms.

Figure 4:
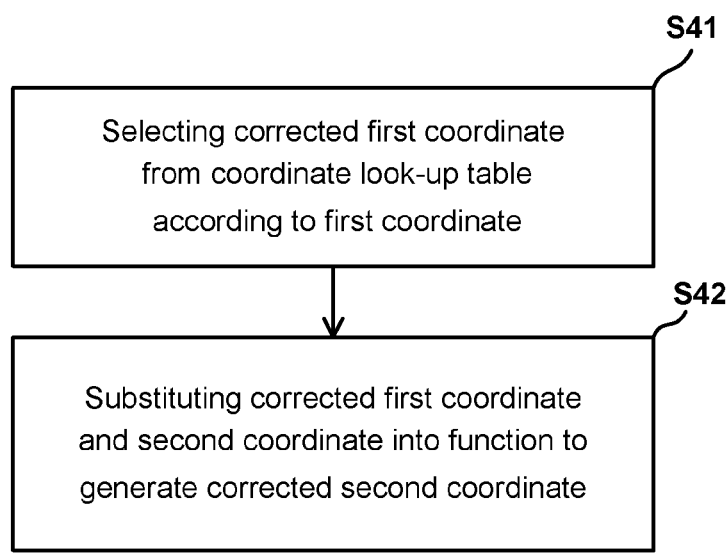
FIG. 4 is a flowchart of a correcting method according to an embodiment of the present invention.

A correcting method applied to a touch panel and a memory is provided according to another embodiment of the present invention. FIG. 4 shows a flowchart of the correcting method. In response to a user touch, the touch panel generates a first coordinate and a second coordinate. The memory stores a coordinate look-up table storing a plurality of corrected coordinates. The correcting method begins with step S41, in which a corrected first coordinate is selected from the coordinate look-up table according to the first coordinate. In step S42, the corrected first coordinate and the second coordinate are substituted into a function to generate a corrected second coordinate corresponding to the second coordinate. Various details in the description associated with the correcting apparatus 100 are applicable to the correcting method, and shall be omitted herein.

A touch panel correcting apparatus for correcting a first coordinate associated with a touch position is provided according to another embodiment of the present invention. The correcting apparatus includes a memory and a controller. The memory stores a coordinate look-up table including a first look-up range and a second look-up range. The first look-up range includes a first corrected coordinate quantity within a unit length, and the second look-up range includes a second corrected coordinate quantity within the unit length. The first corrected coordinate quantity is different from the second corrected coordinate quantity. The controller determines whether the first coordinate corresponds to the first look-up range or the second look-up range. When the first coordinate corresponds to the first look-up range, the controller selects a corrected first coordinate for replacing the first coordinate from the first look-up range. When the first coordinate corresponds to the second look-up range, the controller selects the corrected first coordinate from the second look-up range.

According to yet another embodiment of the present invention, a correcting method for a touch panel and a memory is provided. In response to a user touch, the touch panel generates a first coordinate. The memory stores a coordinate look-up table including a first look-up range and a second look-up range. The first look-up range includes a first corrected coordinate quantity within a unit length, and the second look-up range includes a second corrected coordinate quantity within the unit length. The first corrected coordinate quantity is different from the second corrected coordinate quantity. The correcting method includes: determining whether the first coordinate corresponds to the first look-up range or the second look-up range; when the first coordinate corresponds to the first look-up range, selecting a corrected first coordinate for replacing the first coordinate from the first look-up range; and when the first coordinate corresponds to the second look-up range, selecting the corrected first coordinate from the second look-up range.

A touch panel, and a correcting apparatus and a correcting method thereof are as disclosed by the present invention. A relationship between two corrected coordinates is determined and concluded into a mathematical operation. As such, with the correcting apparatus and the correcting method of the present invention, given one of the corrected coordinate is looked up, the other corrected coordinate can be calculated by a function. Therefore, the look-up table involved in the correcting apparatus and correcting method of the present invention is far smaller than a look-up table in the prior art, thereby reducing hardware costs of a touch system.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch position correcting apparatus for a touch panel, comprising:
   a memory, storing a coordinate look-up table comprising a plurality of corrected coordinates, and a parameter look-up table comprising a plurality of sets of candidate parameters;
   a determining circuit, determining a size of a user touch on said touch panel; and
   a controller, determining an initial first coordinate and an initial second coordinate of said user touch based on signals from touch sensors of said touch panel, selecting a corrected first coordinate from the coordinate look-up table according to the initial first coordinate, selecting a set of parameters from the parameter look-up table according to the size of the user touch, substituting the set of parameters into a function, calculating a corrected second coordinate by inputting the corrected first coordinate and the initial second coordinate into the function, and correcting an initial position of said user touch to an actual touch position comprising the corrected first coordinate and the corrected second coordinate.

2. The touch position correcting apparatus according to claim 1, wherein the coordinate look-up table comprises a first look-up range and a second look-up range; the first look-up range comprises a first corrected coordinate quantity within a unit length, and the second look-up range comprises a second corrected coordinate quantity within the unit length; the first corrected coordinate quantity is different from the second corrected coordinate quantity.

3. The touch position correcting apparatus according to claim 1, wherein the function represents a curve fitted by a Lagrangian algorithm, comprising:

$$\begin{cases} Y_{SLOPE} = a*(X'')^2 + b*X'' + c \\ Y_{OFFSET} = d*(X'')^2 + e*X'' + f \\ Y'' = Y_{SLOPE}*Y + Y_{OFFSET}, \end{cases}$$

where X" represents the corrected first coordinate, a to f are a set of parameters determining a fitting curve for a relationship between the corrected first coordinate, the corrected second coordinate, and the initial second coordinate, Y represents the initial second coordinate, Y" represents the corrected second coordinate, $Y_{SLOPE}$ is a slope according to the corrected first coordinate, and $Y_{OFFSET}$ is an offset according to the corrected first coordinate.

4. The touch position correcting apparatus according to claim 1, wherein the actual touch position is used to execute a corresponding operation on the touch panel apparatus.

5. A touch system to correct an error between an actual touch position and a first touch position sensed by the touch system according to a touch point, comprising:
   a sensing circuit, configured to sense the first touch position and determine an initial first coordinate and an initial second coordinate associated with said first touch position;
   a memory, configured to store a coordinate look-up table comprising a plurality of corrected coordinates, and a parameter look-up table comprising a plurality of sets of candidate parameters; and
   a determining circuit, determining a size of the touch point; and
   a controller, selecting a corrected first coordinate from the coordinate look-up table according to the initial first coordinate, selecting a set of parameters from the parameter look-up table according to the size of the touch point, substituting the set of parameters into a function, calculating a corrected second coordinate by inputting the corrected first coordinate and the initial second coordinate into the function, and correcting the first touch position to an actual touch position comprising the corrected first coordinate and corrected second coordinate.

6. The touch system according to claim 5, wherein the coordinate look-up table comprises a first look-up range and a second look-up range; the first look-up range comprises a first corrected coordinate quantity within a unit length, and the second look-up range comprises a second corrected coordinate quantity within the unit length; the first corrected coordinate quantity is different from the second corrected coordinate quantity.

7. The touch system according to claim 5, wherein the function represents a curve fitted by a Lagrangian algorithm, comprising:

$$\begin{cases} Y_{SLOPE} = a*(X'')^2 + b*X'' + c \\ Y_{OFFSET} = d*(X'')^2 + e*X'' + f \\ Y'' = Y_{SLOPE}*Y + Y_{OFFSET}, \end{cases}$$

where X" represents the corrected first coordinate, a to f are a set of parameters determining a fitting curve for a relationship between the corrected first coordinate, the corrected second coordinate, and the initial second coordinate, Y represents the initial second coordinate, Y" represents the corrected second coordinate, $Y_{SLOPE}$ is a slope according to the corrected first coordinate, and $Y_{OFFSET}$ is an offset according to the corrected first coordinate.

8. A touch position correcting method for a touch panel comprising:
   determining an initial first coordinate and an initial second coordinate of a user touch based on signals from touch sensors of said touch panel;
   selecting a corrected first coordinate from a coordinate look-up table according to the initial first coordinate;
   determining a size of the user touch;
   selecting a set of parameters from a parameter look-up table according to the size of the user touch;
   substituting the set of parameters into a function;
   calculating a corrected second coordinate by inputting the corrected first coordinate and the initial second coordinate into the function; and
   correcting an initial position of said user touch to an actual touch position comprising the corrected first coordinate and the corrected second coordinate.

9. The touch position correcting method according to claim 8, wherein the coordinate look-up table comprises a first look-up range and a second look-up range; the first look-up range comprises a first corrected coordinate quantity within a unit length, and the second look-up range comprises a second corrected coordinate quantity within the unit length; the first corrected coordinate quantity is different from the second corrected coordinate quantity.

10. The touch position correcting method according to claim 8, wherein the function represents a curve fitted by a Lagrangian algorithm, comprising:

$$\begin{cases} Y_{SLOPE} = a*(X'')^2 + b*X'' + c \\ Y_{OFFSET} = d*(X'')^2 + e*X'' + f \\ Y'' = Y_{SLOPE}*Y + Y_{OFFSET}, \end{cases}$$

where X" represents the corrected first coordinate, a to f are a set of parameters determining a fitting curve for a relationship between the corrected first coordinate, the corrected second coordinate, and the initial second coordinate, Y represents the initial second coordinate, Y" represents the corrected second coordinate, $Y_{SLOPE}$ is a slope according to the corrected first coordinate, and $Y_{OFFSET}$ is an offset according to the corrected first coordinate.

* * * * *